US009643726B2

(12) United States Patent
Lepore et al.

(10) Patent No.: US 9,643,726 B2
(45) Date of Patent: *May 9, 2017

(54) LOCKABLE SAFETY DEVICE FOR PREVENTION OF ACCIDENTAL AIRBAG DEPOLYMENT

(71) Applicant: The Boeing Company, Chicago, IL (US)

(72) Inventors: John A. Lepore, St. Charles, MO (US); Thomas E. Dowhower, Summerville, SC (US); Peter M. Heinrich, Pleasant, SC (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/801,994

(22) Filed: Jul. 17, 2015

(65) Prior Publication Data

US 2017/0015425 A1    Jan. 19, 2017

(51) Int. Cl.

| | |
|---|---|
| *B60R 21/01* | (2006.01) |
| *B60R 22/00* | (2006.01) |
| *B64D 11/00* | (2006.01) |
| *B64D 25/00* | (2006.01) |
| *B64D 11/06* | (2006.01) |
| *A44B 11/25* | (2006.01) |

(Continued)

(52) U.S. Cl.
CPC .... *B64D 11/06205* (2014.12); *A44B 11/2526* (2013.01); *B60R 21/18* (2013.01); *B64D 25/00* (2013.01); *B60R 2021/01177* (2013.01); *B60R 2022/021* (2013.01); *B64D 2201/00* (2013.01)

(58) Field of Classification Search
CPC .......... B64D 11/06205; B64D 11/0621; B64D 11/062; B64D 2201/00; B64D 25/00; B60R 21/18; B60R 21/01544; B60R 21/01546; B60R 2021/01177; B60R 2022/021
See application file for complete search history.

(56) References Cited

U.S. PATENT DOCUMENTS

| | | | |
|---|---|---|---|
| 2,997,761 A | 8/1961 | Davis | |
| 3,760,464 A * | 9/1973 | Higuchi | ............. A44B 11/2526 24/196 |
| 3,823,444 A | 7/1974 | Takabayashi | |

(Continued)

FOREIGN PATENT DOCUMENTS

| | | |
|---|---|---|
| GB | 960115 A | 6/1964 |
| WO | 2012158193 A1 | 11/2012 |

OTHER PUBLICATIONS

Extended European Search Report, dated Nov. 15, 2016.

*Primary Examiner* — Barry Gooden, Jr.
(74) *Attorney, Agent, or Firm* — Economou Silfin LLP; John S. Economou (57) ABSTRACT

A safety device for preventing accidental discharge of an airbag. A lower portion of the safety device includes two opposing sidewalls at least partially defining a cavity for holding a seat belt buckle assembly. An upper portion of the safety devices is hingedly coupled to the lower portion. The safety device also includes a mechanism for securely latching the upper portion to the lower portion and a mechanism for releasing the upper portion from the lower portion when the upper portion is securely latched to the lower portion to allow the upper portion to rotate away from the lower portion.

20 Claims, 6 Drawing Sheets

(51) Int. Cl.
*B60R 21/18* (2006.01)
*B60R 22/02* (2006.01)

(56) References Cited

U.S. PATENT DOCUMENTS

| | | | | |
|---|---|---|---|---|
| 3,868,627 A | * | 2/1975 | Lawwill | A44B 11/2511 200/61.58 B |
| 5,960,523 A | * | 10/1999 | Husby | B60R 22/48 24/303 |
| 6,389,661 B1 | | 5/2002 | Brown et al. | |
| 6,442,807 B1 | * | 9/2002 | Adkisson | A44B 11/2503 24/602 |
| 7,263,750 B2 | * | 9/2007 | Keene | A44B 11/2526 24/265 B |
| 7,904,997 B2 | * | 3/2011 | Foubert | A44B 11/2526 24/631 |
| 8,556,293 B2 | * | 10/2013 | Baca | B60R 21/18 280/733 |
| 8,661,625 B2 | | 3/2014 | Carene et al. | |
| 9,173,456 B2 | * | 11/2015 | Kohlndorfer | A44B 11/2526 |
| 2003/0041420 A1 | | 3/2003 | Kosh | |
| 2008/0100051 A1 | * | 5/2008 | Bell | B60R 22/024 280/801.1 |
| 2009/0031541 A1 | | 2/2009 | Pribonic | |
| 2010/0115737 A1 | * | 5/2010 | Foubert | A44B 11/2526 24/164 |
| 2012/0256403 A1 | * | 10/2012 | Shields | B60R 22/48 280/733 |
| 2012/0259503 A1 | * | 10/2012 | Settles | G05B 23/0256 701/31.5 |
| 2012/0259586 A1 | * | 10/2012 | Shields | G05B 23/0256 702/183 |
| 2012/0292893 A1 | * | 11/2012 | Baca | B60R 21/18 280/730.1 |
| 2013/0187646 A1 | * | 7/2013 | Baca | G01R 33/0047 324/262 |

* cited by examiner

LOCKABLE SAFETY DEVICE FOR PREVENTION OF ACCIDENTAL AIRBAG DEPOLYMENT

FIELD

This disclosure relates generally to a safety device used to prevent the accidental deployment of airbags, particularly during installation of assemblies including airbags.

BACKGROUND

Recently, airlines have begun to include airplane airbags in the seat belts of at least some seats in their airplanes. These airplane airbags have been found to lessen the impact of minor accidents on passengers, and in particular to reduce head and neck injury to the passengers. Such airbags operate differently than automotive airbags, which expand out of the car dashboard towards the driver or front seat passenger. Instead, airplane airbags inflate away from the passenger to generate a cushion between the passenger and any structure forward of the passenger (e.g., another row of seats or a bulkhead).

Airplane airbags are typically energized for activation only when the tongue plate (or latch plate) and buckle on the passenger's seat belt are fastened together. Airbag inflation occurs at a very high rate. To prevent accidental activation of such airbags, it is important to ensure that no power is provided during the shipping, assembly, and installation of seat belts that include airplane airbags. For the same reason, it is also important to ensure that the tongue plate and buckle portions of the passenger seat belt be kept separated because static charge might accumulate on the tongue plate and buckle and possibly cause airbag inflation. Typically, the buckle and tongue plate for airplane seat belts are both formed from metallic materials.

To keep the two portions (buckle and tongue plate) separate, at least one of the two portions is typically wrapped in a plastic wrap material to prevent contact between the two metallic parts during shipping, assembly and installation. However, this is not a robust solution as the plastic wrap material used to cover the part (or parts) is easily torn, potentially allowing contact between the buckle and tongue plate and thus potentially risking airbag inflation during shipping, assembly and installation. Furthermore, a worker might remove the plastic wrap material prior to assembly and installation, not understanding that that plastic wrap material provided protection from accidental airbag discharge.

SUMMARY

In one aspect, a safety device for preventing accidental discharge of an airbag. The safety device includes a lower portion comprising two opposing sidewalls at least partially defining a cavity for holding a seat belt buckle assembly and an upper portion hingedly coupled to the lower portion. The safety device also includes a means for securely latching the upper portion to the lower portion, and a means for releasing the upper portion from the lower portion when the upper portion is securely latched to the lower portion to allow the upper portion to rotate away from the lower portion.

In one further embodiment, the means for securely latching the upper portion to the lower portion may include a locking arm having an end projection mounted on the upper portion and a tab extending inward on an inner portion of one of the opposing sidewalls of the lower portion. The end projection may be configured to engage the tab when the upper portion is rotated against the lower portion to hold the upper portion securely against the lower portion. Still further, the means for releasing may comprise a movable release tab mounted in an aperture of one of the opposing sidewalls of the lower portion. The aperture may be positioned adjacent to the tab extending inward on the inner portion of one of the opposing sidewalls so that an inner surface of the movable release tab is in contact with the end projection when the upper portion is securely latched against the lower portion. The means for releasing further may include at least one spring positioned between an internal step in the aperture and the movable release tab. Still further, the movable release tab may include a means for locking the safety device in a closed position with the upper portion held securely latched against the lower portion. The means for locking may be a locking member mounted in an aperture in the movable release tab, the aperture positioned to prevent the movable release tab from moving inward until the locking member is removed.

In another further embodiment, the means for securely latching the upper portion to the lower portion may have two locking arms each having an end projection mounted on the upper portion and two tabs each extending inward on respective ones of the two opposing sidewalls of the lower portion, each end projection configured to engage an associated one of the two tabs when the upper portion is rotated against the lower portion to hold the upper portion securely against the lower portion. Further, the means for releasing may include movable release tabs mounted in associated apertures of each of the opposing sidewalls of the lower portion, each aperture positioned adjacent to the associated tab extending inward on the inner portion of the associated one of the opposing sidewalls so that an inner surface of the associated movable release tab is in contact with the associated end projection when the upper portion is securely latched against the lower portion. The means for releasing further may include at least one spring positioned between an internal step in each aperture and each movable release tab. Still further, each movable release tab may include a means for locking the safety device in a closed position with the upper portion held securely latched against the lower portion.

In a second aspect, a safety device for preventing accidental discharge of an airbag. A lower portion of the safety device has two opposing sidewalls at least partially defining a cavity for holding a seat belt buckle assembly. An upper portion of the safety device is hingedly coupled to the lower portion. The safety device also includes a latching mechanism for securely latching the upper portion to the lower portion and a releasing mechanism for releasing the upper portion from the lower portion when the upper portion is securely latched to the lower portion to allow the upper portion to rotate away from the lower portion.

In one further embodiment, the releasing mechanism may include a movable release tab mounted in an aperture of one of the opposing sidewalls of the lower portion, the aperture positioned adjacent to a tab extending inward on an inner portion of one of the opposing sidewalls so that an inner surface of the movable release tab is in contact with an end projection of a locking arm of the upper portion when the upper portion is securely latched against the lower portion. The releasing mechanism further may include at least one spring positioned between an internal step in the aperture and the movable release tab. Further, the movable release tab may have a means for locking the safety device in a closed position with the upper portion held securely latched against the lower portion. The means for locking may be a locking member mounted in an aperture in the movable release tab, the aperture positioned to prevent the movable release tab from moving inward until the locking member is removed.

In another further embodiment, the means for releasing may be movable release tabs mounted in associated apertures of each of the opposing sidewalls of the lower portion, each aperture positioned adjacent to an associated tab extending inward on an inner portion of an associated one of the opposing sidewalls so that an inner surface of the associated movable release tab is in contact with an associated end projection of an associated locking arm of the upper portion when the upper portion is securely latched against the lower portion. The releasing mechanism further may include at least one spring positioned between an internal step in each aperture and each movable release tab. Further, each movable release tab may includes a means for locking the safety device in a closed position with the upper portion held securely latched against the lower portion.

In a third aspect, a method for securely covering and uncovering a buckle assembly of a seatbelt using a safety device. The safety device includes a lower portion comprising two opposing sidewalls at least partially defining a cavity for holding a seat belt buckle assembly, an upper portion hingedly coupled to the lower portion, a latching mechanism for securely latching the upper portion to the lower portion, and a releasing mechanism for releasing the upper portion from the lower portion when the upper portion is securely latched to the lower portion to allow the upper portion to rotate away from the lower portion. To perform the method, the buckle assembly is positioned in the cavity of the lower portion such that a strap coupled to the buckle assembly extends from the lower portion through the slot area. Then, the upper portion is rotated with respect to the lower portion to engage the latching mechanism and so that the buckle assembly is secure in the cavity with the upper portion completely covering the buckle assembly. Finally, the release mechanism is selectively engaged to allow the upper portion to rotate away from the lower portion to uncover the buckle assembly and allow the buckle assembly to be removed from the cavity.

In a further embodiment, the releasing mechanism has at least one movable release tab mounted in an associated aperture of an associated one of the opposing sidewalls of the lower portion. In this further embodiment, the release mechanism is engaged by pressing the movable release tab in an inward direction.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure. The safety device described herein can prevent any contact between the two portions of the seat belt buckle mechanism and thus overcomes the problems recited above.

Figure 1:
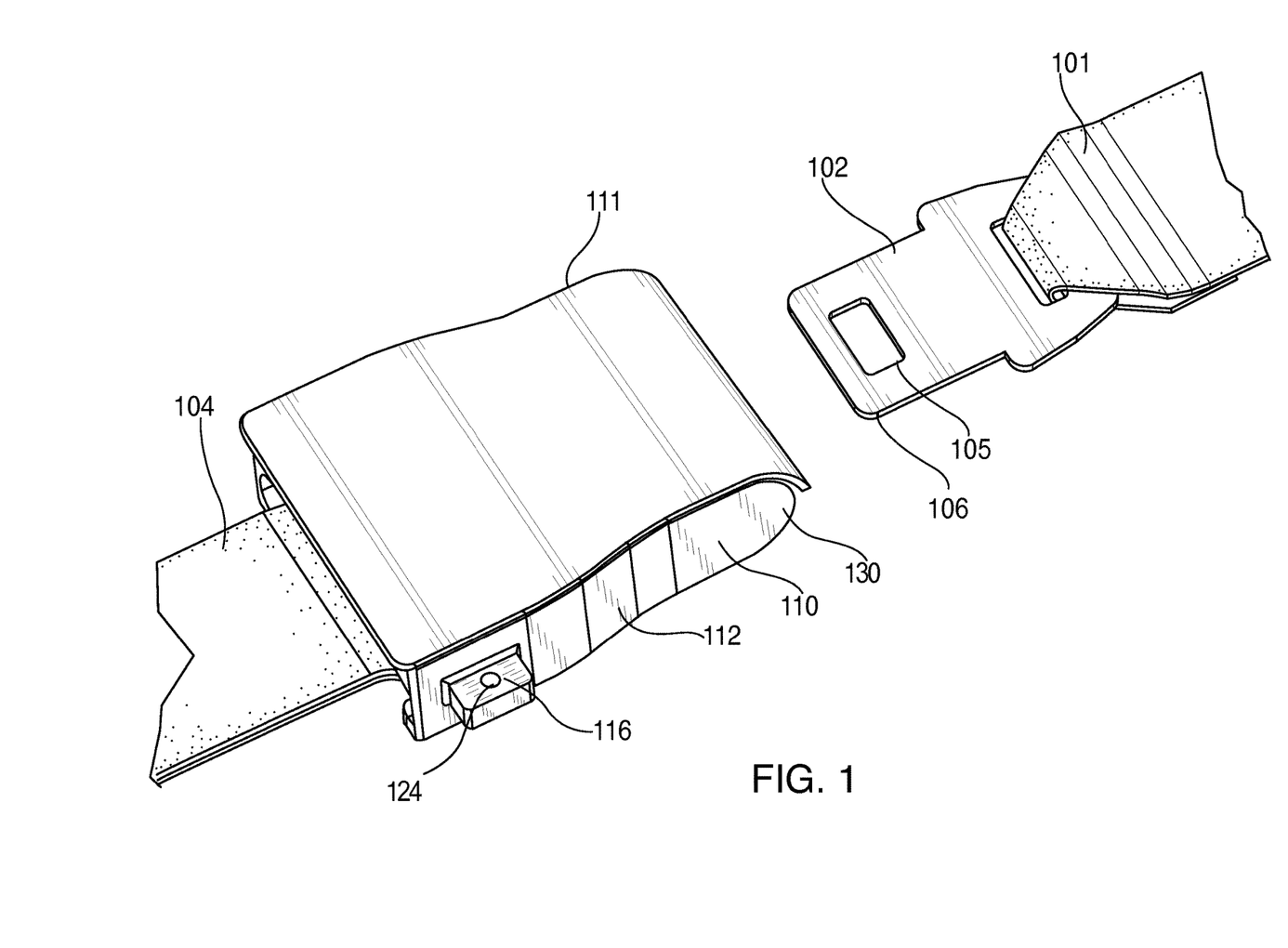
FIG. 1 is a perspective upper view of a closed safety device according to an embodiment of the present disclosure with a seat belt buckle installed therein.
Figure 2:
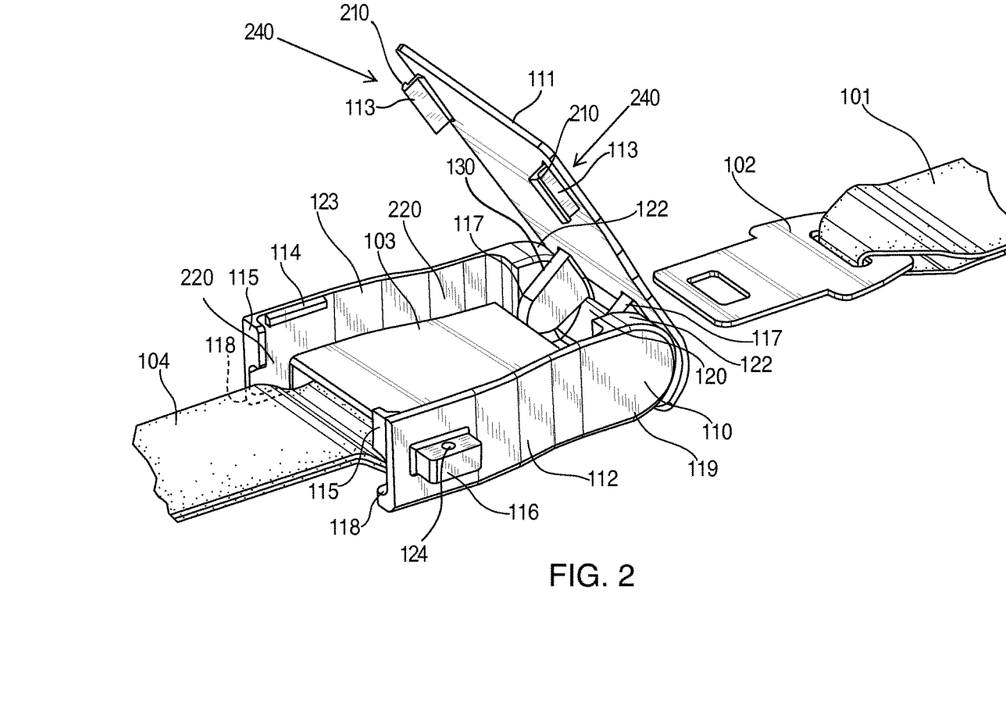
FIG. 2 is a perspective upper view of an open safety device according to an embodiment of the present disclosure with a seat belt buckle installed therein.

Referring now to FIG. 1, a safety device 110 is shown which provides a robust solution to the problems of the prior art discussed above. An airplane seatbelt includes a first strap 101 and an associated tongue plate 102, and a second strap 104 and an associated buckle assembly 103 (shown in FIG. 2). Tongue plate 102 has an outer periphery 106 and includes an inner aperture 105. During use, a passenger secures the seatbelt by inserting tongue plate 102 into buckle assembly 103, which holds tongue plate 102 securely until the buckle assembly is released by the passenger. The insertion of tongue plate 102 into buckle assembly 103 may also activate an associated airplane airbag, when installed. Safety device 110 includes a lower portion 112 and an upper portion 111 which are coupled together to form a clamshell structure via a hinge mechanism 130. The lower portion 112 defines a cavity 220 (FIG. 2). When positioned over buckle assembly 103 and the upper portion 111 is secured against the lower portion 112, safety device 110 completely covers buckle assembly 103 to eliminate contact between buckle assembly 103 and tongue plate 102, which can prevent activation of an associated airplane airbag and thus preventing any accidental discharge of the airplane airbag.

Each portion 111, 112 of safety device 110 is constructed from a non-conductive material, e.g., a thermoplastic material. In one embodiment, safety device 110 is configured to cover any seat belt buckle assembly found on commercial, commuter, or private aircraft. In another embodiment, different sizes of safety device 110 may be provided for differently-sized buckle assemblies. Safety device 110 can prevent accidental discharge of the airplane airbags until installation is complete, when safety device 110 may be removed. Safety device 110 also includes a mounting tab 116, preferably including an aperture 124 therein. The aperture 124 may be used to secure a tag including instructions for use and appropriate safety warnings to the safety device 110. Mounting tab 116 may also be used to secure an external fastener, such as a wire or string, around safety device 110 to ensure that safety device 110 remains closed until assembly is complete. A second mounting tab 116 may be provided on the opposite side of lower portion 112 to more easily secure such external fastener.

Referring now to FIG. 2, buckle assembly 103 is shown positioned in the lower portion 112 of safety device 110. The lower portion 112 includes two opposing sidewalls 119, 123 and a third sidewall wall 120 mounted on a planar portion 121 (shown in FIG. 3). The sidewalls 119, 123 and the third sidewall wall 120 at least partially defined the cavity 220. The lower portion 112 includes at least one rear wall portion 115 to prevent buckle assembly 103 from sliding out of the safety device 110 when in a closed position (as shown in FIG. 1), while also allowing buckle assembly 103 with its associated strap 104 to be inserted into safety device 110. The at least one rear wall portion 115 further defines the cavity 220. In FIG. 2, two inwardly extending rear wall portions 115 are provided at a rear part of the lower portion 112, which form a partially enclosed slot area 118 and a gap 230 between each inwardly extending rear wall portion 115. In an alternative embodiment, the two inwardly extending rear wall portions 115 may be replaced by a single rear wall portion, in which case strap 104 may be temporarily disengaged from buckle assembly 103 for installation of buckle assembly 103 into safety device 110.

Slot area 118 provides spacing to allow strap 104 to exit via the rear portion of safety device 110 after buckle assembly 103 is installed therein. Slot area 118 may also extend into the bottom part of lower portion 112, as shown by reference number 310 in FIG. 3. The upper portion 111 of safety device 110 may include a latching mechanism 240 having two locking arms 113, which include end projections 210 where the end projections 210 mate with tabs 114 (one of the tabs 114 is not visible in FIG. 2) when the upper portion 111 is pushed down for securely latching the upper portion 111 against lower portion 112. In an alternative embodiment, latching mechanism 240 may include only one locking arm 113 to mate with a single tab 114 for securely latching the upper portion 111 against lower portion 112.

Upper portion 111 is hingedly connected to lower portion 112 in any conventional manner. In one example, the lower portion 112 and the upper portion 111 are formed as separate parts. In such an embodiment, the hinge mechanism 130 may include two projections 117 extending from the upper portion 111 and pins extending outwardly and include an aperture in a widened internal portion 122 of each sidewall 119, 123 in lower portion 112. The pins are positioned in an associated aperture in the widened internal portions 112 of the sidewalls 119, 123 to form the hinge mechanism 130. Other types of hinge mechanisms may also be alternatively used. For example, in an alternative embodiment, upper portion 111 and lower portion 112 may be formed together as a single part, and the hinge mechanism is formed as a hinge line defined in the material along the edge separating the upper portion 111 from the lower portion 112. The hinge line can be a crease, perforated line, groove, or any other suitable line of weakness that allows the upper portion 111 and the lower portion 112 to rotate relative to each other.

To use safety device 110, the buckle assembly 103 is positioned in the cavity 220 of the lower portion 112 such that strap 104 coupled to buckle assembly 103 extends from the lower portion 112 through the slot area 118. The upper portion 111 is rotated with respect to the lower portion 112 such that the upper portion 112 completely covers the buckle assembly 103 (as shown in FIG. 1). Finally, the upper portion 112 is engaged with the lower portion 111 to secure the buckle assembly 103 in the cavity 220 of the lower portion 112. Once the upper portion 112 is engaged with the lower portion 111, the upper portion 112 completely covers the cavity 220 of the lower portion 111.

Figure 3:
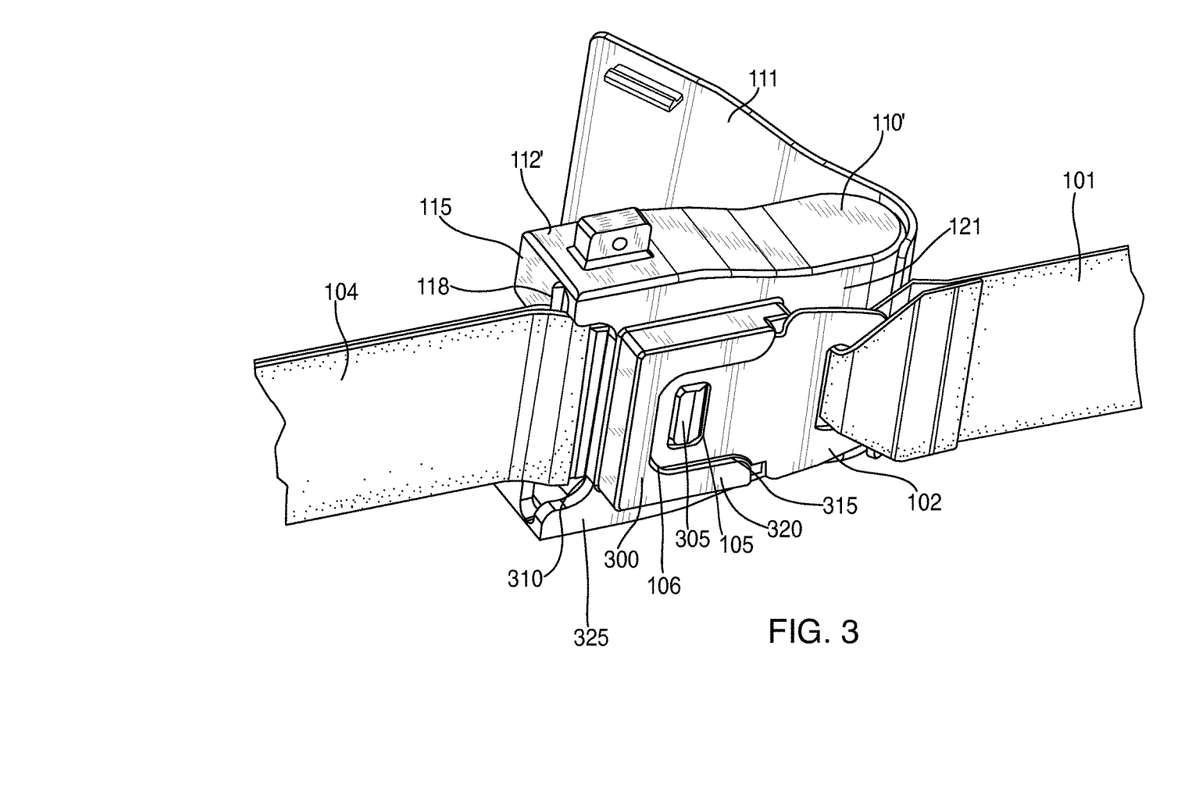
FIG. 3 is a perspective lower view of an open safety device according to one further embodiment of the present disclosure with a seat belt buckle installed therein.

Referring now to FIG. 3, in a further embodiment, safety device 110' is substantially similar to safety device 110 shown in FIGS. 1 and 2, except lower portion 112' may include a tongue plate securing structure 300 formed on a lower surface 325 of lower portion 112' for securely holding tongue plate 102 during shipping, assembly, and installation. In this manner, an additional measure of security can be provided to help ensure that tongue plate 102 will not be able to be contact buckle assembly 103. Securing structure 300 includes a built-up area 320 forming a channel 315 and also includes a tab 305 within slot 315. Channel 315 is adapted to fit the outer periphery 106 of tongue plate 102. Tab 305 is sized to fit snugly into the inner aperture 105 in tongue plate 102, such that when tongue plate 102 is positioned into slot 315 and onto tab 305, tongue plate 102 is held there securely and separately from buckle assembly 103. In this manner, tongue plate 102 may be positioned against the lower surface 325 so that outer periphery 106 of tongue plate 102 fits into channel 315 and tab 305 snugly fits into inner aperture 105 of tongue plate 102, securely holding tongue plate 102 to lower portion 112'.

Figure 4:
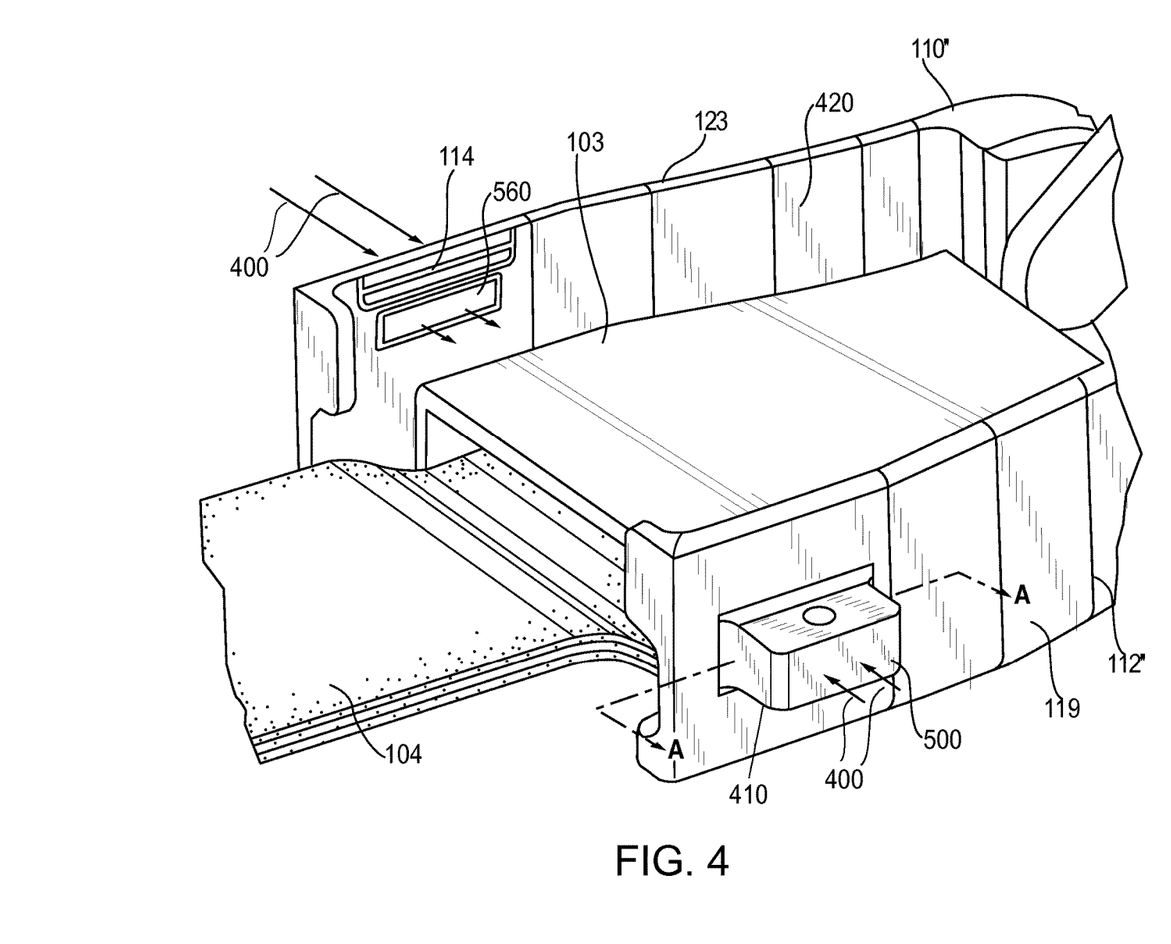
FIG. 4 is a perspective upper close-up view of an open safety device according to another further embodiment of the present disclosure with a seat belt buckle installed therein.

Referring now to FIG. 4, in another further embodiment, safety device 110" is substantially similar to safety device 110 shown in FIGS. 1 and 2, except safety device 110" includes a release mechanism 410 for releasing the upper portion 111 from the lower portion 112" when the upper portion 111 is securely latched to the lower portion 112" to allow the upper portion 111 to rotate away from the lower portion 112". In particular, release mechanism 400 includes a movable release tab 500 installed in an associated aperture in each sidewall 119, 123. Safety device 110" can also include the securing structure 300 shown in FIG. 3. The release mechanism 410 can replace the mounting tab 116 (shown in FIGS. 1 and 2) or can be included in addition to the mounting tab 116.

In some embodiments only a single movable release tab 500 may be mounted on one of the sidewalls 119, 123. The release mechanism 410 allows a more robust engagement between each locking arm 113 and associated tab 114, preventing accidental release, and, as discussed below, may also allow the release mechanism 410 to be maintained in a locked position until a locking member is actively removed. The release mechanism 410 preferably includes a biasing mechanism 590 that includes, in one example, at least one internal spring 520 (shown in detail in FIGS. 5A and 5B); however, biasing mechanism 590 can include any suitable components that enable release mechanism 410 to function as described herein. The basing mechanism 590 maintains the inner surface 560 of release tab 500 flush with the inner surface 420 of the associated sidewall 119 in a relaxed (non-activated) position. The biasing mechanism 590 may also be configured to hold the associated release tab 500 in the associated aperture 595 in sidewall 119. In an alternative embodiment, each release tab 500 may be held captively in the associated aperture 595.

When pressure is applied against each release tab 500 along lines 400, the internal spring 520 (in this embodiment, two springs 520) compresses and the inner surfaces 560 of each release tab 500 move inward in a non-relaxed (activated) position. Thus, when upper portion 111 is secured against lower portion 112" and in the activated position, the inner surfaces 560 each move against the end projections 210 of the associated locking arms 113 (shown in FIG. 2) and disengage each locking arm 113 from the associated tab 114, thereby allowing the upper portion 111 to rotate away from lower portion 112" (as shown in FIG. 1). In an alternative embodiment, each release tab 500 may be held captively in the associated aperture 595 in a manner known to those of skill in the art (e.g., by configuring the aperture to be press-fit) and the biasing mechanism 590 may be omitted.

Figure 5A:
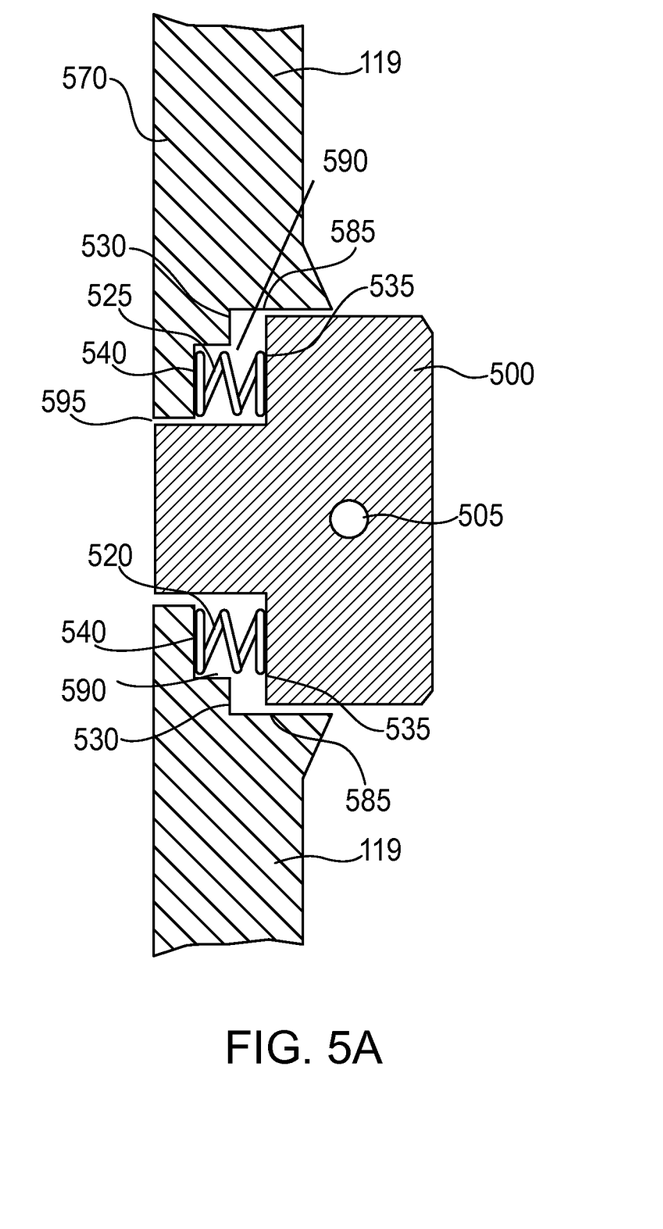
FIGS. 5A and 5B are cross-sectional views take along line A-A in FIG. 4 showing the operation of the release mechanism.

Referring now to FIG. 5A, a cross-sectional view along line A-A in FIG. 4 is provided of the relaxed (non-activated) position. In particular, a movable release tab 500, preferably having an aperture 505 therein (as described below), is shown positioned in a stepped aperture 580 defined in sidewall 119. In particular, the stepped aperture 580 includes a first step 540 and a second step 530 in each sidewall 585 forming the aperture 580. A spring 520 of biasing mechanism 590 is provided between the first step 540 and an inner rear wall 535 of release tab 500 on each side of release tab 500. In the relaxed (non-activated) position shown in FIG. 5A, no tension is applied against each spring 520 and an amount of free space exists between each surface of second step 530 and the surface of each inner rear wall 535. In addition, in this position, outer rear wall 560 of release tab 500 is coplanar (i.e., flush) with the inner wall 570 of sidewall 119. In an alternative embodiment, only one spring 520 may be provided.

Figure 5B:
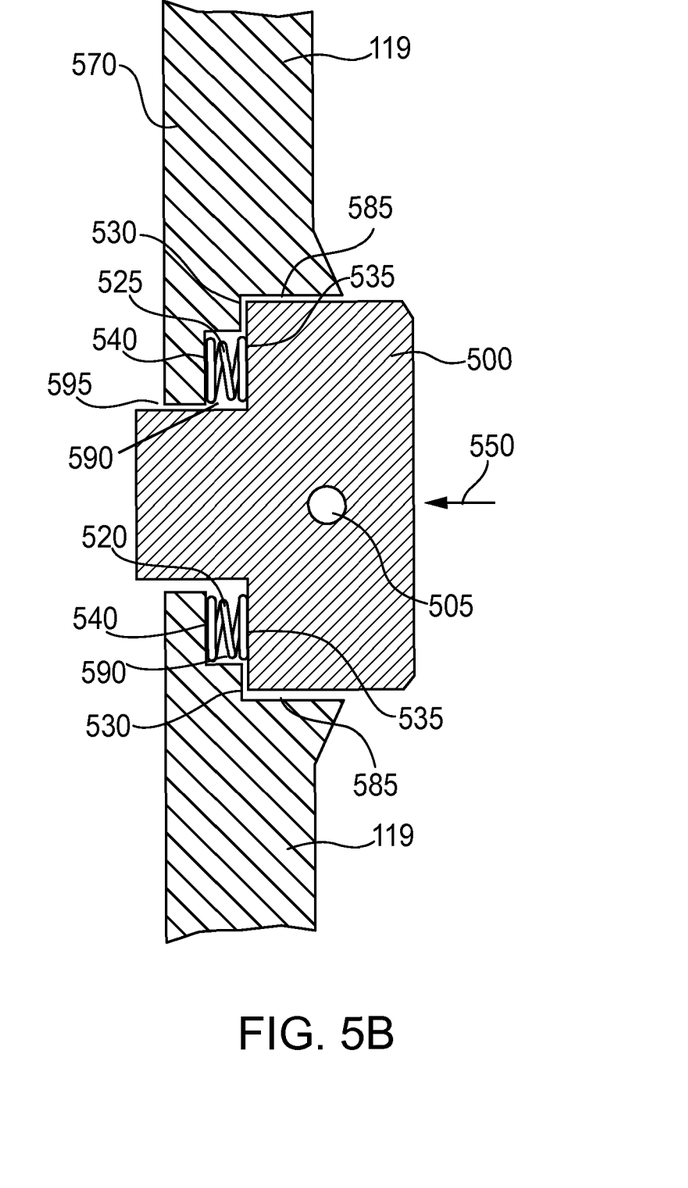

Referring now to FIG. 5B, a cross-sectional view along line A-A in FIG. 4 is provided of the non-relaxed (activated) position. In particular, in this position, as pressure is applied along line 550 (also shown as line 400 in FIG. 4), each spring 525 becomes compressed and release tab 500 moves inwards until the inner surface of second step 530 is in contact with the surface of each inner rear wall 535. The inner surface 560 of release tab 500 moves inward beyond the plane formed by inner wall 570 of sidewall 119. As discussed above, upper portion 111 is held secure against lower portion 112" by engaging the end projection 210 of each locking arm 113 with the associated tabs 114 (shown in FIG. 2). In the non-relaxed (activated) position, the inner surface 560 of release tab 500 pushes against the end projection 210 of the associated locking arm 113, thereby disengaging such end projection 210 from the associated tab 114 and allowing the upper portion 111 to freely rotate away from lower portion 112".

In operation, the buckle assembly 103 is first positioned in the cavity 220 of the lower portion 112" such that strap 104 coupled to the buckle assembly 103 extends from the lower portion 112" through the slot area 118. Next, the upper portion 111 is rotated with respect to the lower portion 112" to engage the latching mechanism 240 and so that the buckle assembly 103 is secure in the cavity 110 with the upper portion 111 completely covering the buckle assembly 103. Finally, the release mechanism 410 is selectively engaged to allow the upper portion 11 to rotate away from the lower portion 112" to uncover the buckle assembly 103 and allow the buckle assembly 103 to be removed from the cavity 220. The release mechanism 410 may be selectively engaged by pressing the movable release tab 500 in an inward direction (as shown by arrows 400 in FIG. 4).

As shown in FIG. 4, each movable release tab 500 includes an aperture 505 that enables the release mechanism 410 to held in a locked position (with the upper portion 111 held secure against the lower portion 112"). When upper portion 111 is secured against lower portion 112", the end projection 210 of each associated locking arm 113 engages with the associated tab 114 (FIG. 2). A wire, rod, or other type of locking member (not shown) may be inserted through aperture 505, thereby preventing release tab 500 from moving inward to the non-relaxed (activated) position. In this manner, an additional level of protection is provided, as the upper portion 111 is not released without performing two separate steps, (1) first removing the structure inserted into aperture 505; and (2) second pressing each release tab 500 inward (or the single release tab 500 when only one is provided).

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A safety device for preventing accidental discharge of an airbag, the safety device comprising:
    a lower portion comprising two opposing sidewalls at least partially defining a cavity for holding a seat belt buckle assembly;
    an upper portion hingedly coupled to the lower portion;
    means for securely latching the upper portion to the lower portion; and
    means for releasing the upper portion from the lower portion when the upper portion is securely latched to the lower portion to allow the upper portion to rotate away from the lower portion.

2. The safety device of claim 1, wherein the means for securely latching the upper portion to the lower portion comprises a locking arm having an end projection mounted on the upper portion and a tab extending inward on an inner portion of one of the opposing sidewalls of the lower portion, the end projection configured to engage the tab when the upper portion is rotated against the lower portion to hold the upper portion securely against the lower portion.

3. The safety device of claim 2, wherein the means for releasing comprises a movable release tab mounted in an aperture of one of the opposing sidewalls of the lower portion, the aperture positioned adjacent to the tab extending inward on the inner portion of one of the opposing sidewalls so that an inner surface of the movable release tab is in contact with the end projection when the upper portion is securely latched against the lower portion.

4. The safety device of claim 3, wherein the means for releasing further comprises at least one spring positioned between an internal step in the aperture and the movable release tab.

5. The safety device of claim 3, wherein the movable release tab includes a means for locking the safety device in a closed position with the upper portion held securely latched against the lower portion.

6. The safety device of claim 5, wherein the means for locking comprises a locking member mounted in an aperture in the movable release tab, the aperture positioned to prevent the movable release tab from moving inward until the locking member is removed.

7. The safety device of claim 1, wherein the means for securely latching the upper portion to the lower portion comprises two locking arms each having an end projection mounted on the upper portion and two tabs each extending inward on respective ones of the two opposing sidewalls of the lower portion, each end projection configured to engage an associated one of the two tabs when the upper portion is rotated against the lower portion to hold the upper portion securely against the lower portion.

8. The safety device of claim 7, wherein the means for releasing comprises movable release tabs mounted in associated apertures of each of the opposing sidewalls of the lower portion, each aperture positioned adjacent to the associated tab extending inward on the inner portion of the associated one of the opposing sidewalls so that an inner surface of the associated movable release tab is in contact with the associated end projection when the upper portion is securely latched against the lower portion.

9. The safety device of claim 8, wherein the means for releasing further comprises at least one spring positioned between an internal step in each aperture and each movable release tab.

10. The safety device of claim 9, wherein each movable release tab includes a means for locking the safety device in a closed position with the upper portion held securely latched against the lower portion.

11. A safety device for preventing accidental discharge of an airbag, the safety device comprising:
 a lower portion comprising a planar portion and two opposing sidewalls connected to the planar portion, the lower portion defining a cavity having a volume at least as large as an entire seat belt buckle assembly;
 an upper portion hingedly coupled to the lower portion;
 a latching mechanism for securely latching the upper portion to the lower portion; and
 a releasing mechanism for releasing the upper portion from the lower portion when the upper portion is securely latched to the lower portion to allow the upper portion to rotate away from the lower portion.

12. The safety device of claim 11, wherein the releasing mechanism comprises a movable release tab mounted in an aperture of one of the opposing sidewalls of the lower portion, the aperture positioned adjacent to a tab extending inward on an inner portion of one of the opposing sidewalls so that an inner surface of the movable release tab is in contact with an end projection of a locking arm of the upper portion when the upper portion is securely latched against the lower portion.

13. The safety device of claim 12, wherein the releasing mechanism further comprises at least one spring positioned between an internal step in the aperture and the movable release tab.

14. The safety device of claim 12, wherein the movable release tab includes a means for locking the safety device in a closed position with the upper portion held securely latched against the lower portion.

15. The safety device of claim 14, wherein the means for locking comprises a locking member mounted in an aperture in the movable release tab, the aperture positioned to prevent the movable release tab from moving inward until the locking member is removed.

16. The safety device of claim 11, wherein the releasing mechanism comprises movable release tabs mounted in associated apertures of each of the opposing sidewalls of the lower portion, each aperture positioned adjacent to an associated tab extending inward on an inner portion of an associated one of the opposing sidewalls so that an inner surface of the associated movable release tab is in contact with an associated end projection of an associated locking arm of the upper portion when the upper portion is securely latched against the lower portion.

17. The safety device of claim 16, wherein the releasing mechanism further comprises at least one spring positioned between an internal step in each aperture and each movable release tab.

18. The safety device of claim 17, wherein each movable release tab includes a means for locking the safety device in a closed position with the upper portion held securely latched against the lower portion.

19. A method for securely covering and uncovering a buckle assembly of a seatbelt using a safety device, the safety device including a lower portion comprising a planar portion and two opposing sidewalls connected to the planar portion, the lower portion defining a cavity having a volume at least as large as an entire seat belt buckle assembly, an upper portion hingedly coupled to the lower portion, a latching mechanism for securely latching the upper portion to the lower portion, and a releasing mechanism for releasing the upper portion from the lower portion when the upper portion is securely latched to the lower portion to allow the upper portion to rotate away from the lower portion, the method comprising:
 positioning the buckle assembly in the cavity of the lower portion such that a strap coupled to the buckle assembly extends from the lower portion through the slot area;
 rotating the upper portion with respect to the lower portion to engage the latching mechanism and so that the buckle assembly is secure in the cavity with the upper portion completely covering the buckle assembly; and
 selectively engaging the release mechanism to allow the upper portion to rotate away from the lower portion to uncover the buckle assembly and allow the buckle assembly to be removed from the cavity.

20. The method of claim 19, wherein the releasing mechanism comprises at least one movable release tab mounted in an associated aperture of an associated one of the opposing sidewalls of the lower portion, and wherein the step of engaging the release mechanism comprises pressing the movable release tab in an inward direction.

* * * * *